US008841809B2

(12) United States Patent
Zrno

(10) Patent No.: US 8,841,809 B2
(45) Date of Patent: Sep. 23, 2014

(54) SYNCHRONOUS BRUSHLESS MULTIPOLAR MACHINE HAVING IMMOBILE ARMATURE AND FIELD WINDINGS

(76) Inventor: Daniel Zrno, Velika Gorica (HR)

(*) Notice: Subject to any disclaimer, the term of this patent is extended or adjusted under 35 U.S.C. 154(b) by 331 days.

(21) Appl. No.: 13/456,817

(22) Filed: Apr. 26, 2012

(65) Prior Publication Data

US 2012/0274164 A1 Nov. 1, 2012

(30) Foreign Application Priority Data

Apr. 26, 2011 (HR) .............................. P 20110305 A
Mar. 27, 2012 (EP) .................................... 12486001

(51) Int. Cl.
*H02K 16/02* (2006.01)
*H02K 19/24* (2006.01)
*H02P 9/00* (2006.01)

(52) U.S. Cl.
CPC ................. *H02K 19/24* (2013.01); *H02K 16/02* (2013.01); *H02P 2009/004* (2013.01); *Y02E 10/725* (2013.01)
USPC ................. 310/114; 310/156.36; 310/156.37; 310/216.025; 310/263; 290/44; 290/55

(58) Field of Classification Search
CPC ...... H02K 16/02; H02K 19/24; Y02E 10/725; H02P 2009/004
USPC ........ 310/114, 156.36, 156.37, 216.025, 263; 290/44, 55
See application file for complete search history.

(56) References Cited

U.S. PATENT DOCUMENTS

| | | | | | |
|---|---|---|---|---|---|
| 2,928,963 | A | * | 3/1960 | Bertsche et al. | 310/168 |
| 3,548,226 | A | * | 12/1970 | Sato | 310/68 D |
| 4,611,139 | A | * | 9/1986 | Godkin et al. | 310/266 |
| 5,519,277 | A | * | 5/1996 | York et al. | 310/263 |
| 6,355,999 | B1 | * | 3/2002 | Kichiji et al. | 310/112 |
| 6,661,151 | B2 | * | 12/2003 | Tan et al. | 310/263 |
| 6,828,710 | B1 | * | 12/2004 | Gabrys | 310/179 |
| 7,042,109 | B2 | * | 5/2006 | Gabrys | 290/44 |
| 2011/0304150 | A1 | * | 12/2011 | Hara | 290/55 |
| 2012/0274164 | A1 | * | 11/2012 | Zrno | 310/114 |

FOREIGN PATENT DOCUMENTS

| | | |
|---|---|---|
| DE | 89 13 328 U1 | 2/1990 |
| DE | 196 36 591 A1 | 3/1998 |
| EP | 0 120 067 B1 | 6/1984 |
| EP | 1 394 406 A2 | 3/2004 |

* cited by examiner

*Primary Examiner* — John K Kim
(74) *Attorney, Agent, or Firm* — Buchanan Ingersoll & Rooney

(57) ABSTRACT

A synchronous multipolar brushless machine includes an immobile stator armature and field windings, which are placed concentrically around a shaft and radially inwardly positioned relative to the stator armature, on a power unit carrying disc, so that the field windings and armature windings form a mechanically connected unit which generates an excitation magnetic field, and in which an alternate voltage is generated. The excitation magnetic field is transferred to a rotor via labyrinth shaped first and second air gaps. A multipolar rotating magnetic field is generated around the stator armature while the synchronous machine is operated, thereby magnetizing the rotor. In order to reduce magnetic flux resistance, a ferromagnetic tolerance ring is inserted in each first and second air gap. Alternatively, a ferrofluid is provided in each first and second air gap, which significantly increases the magnetic conductivity.

18 Claims, 10 Drawing Sheets

F I G. 3
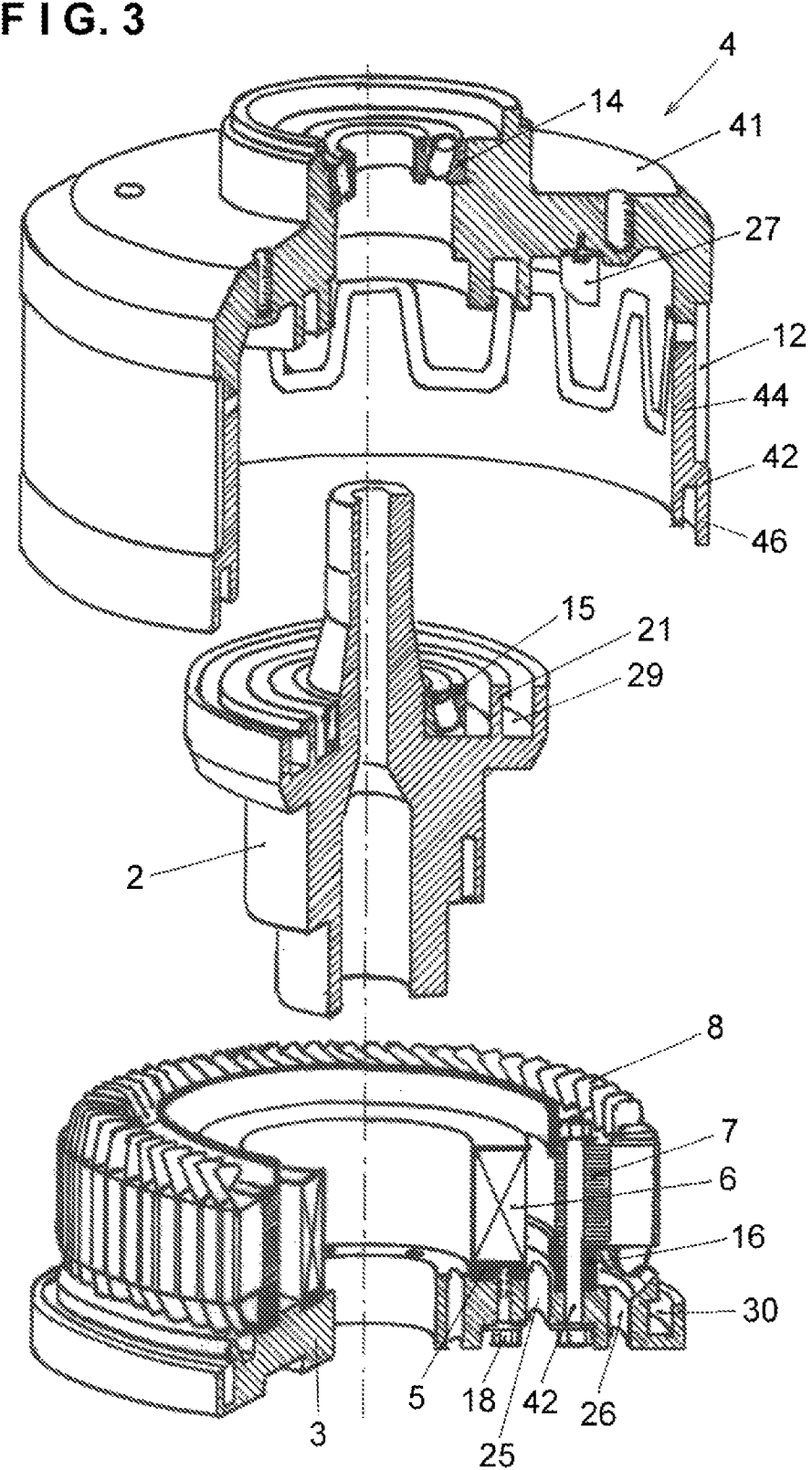

F I G. 5
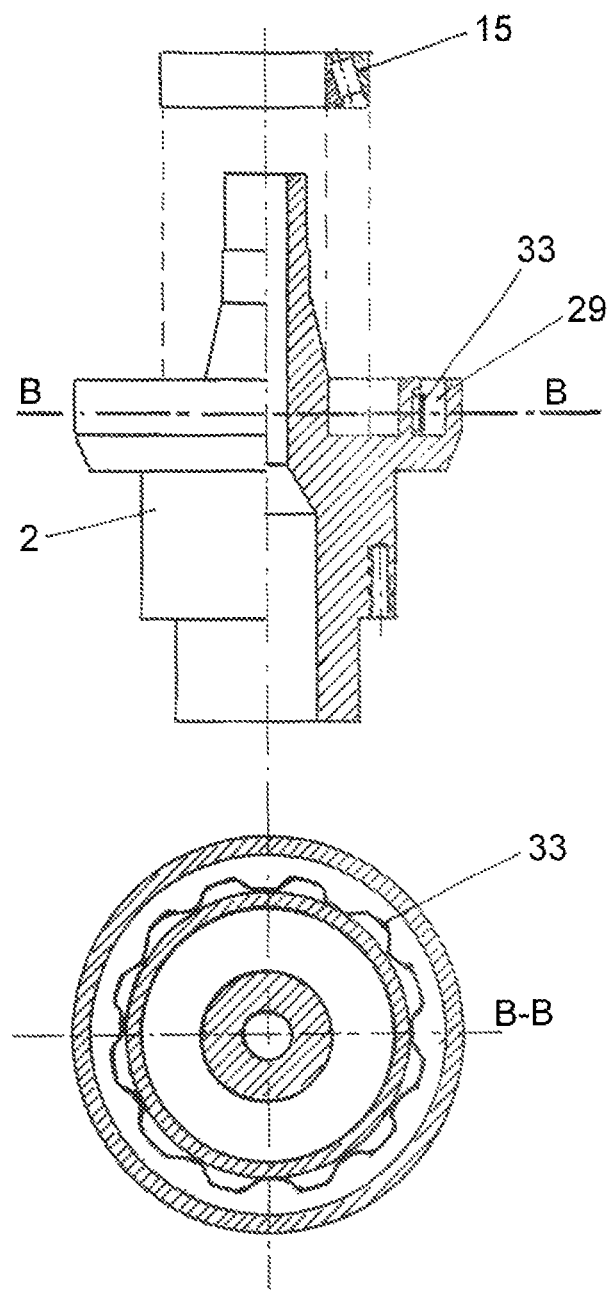

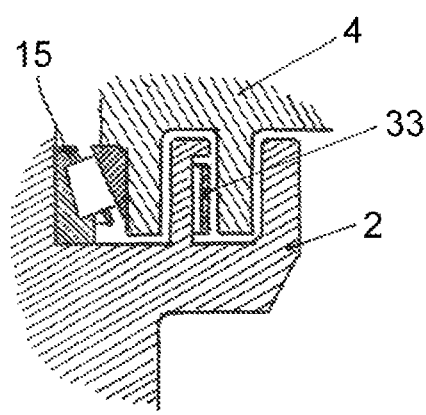
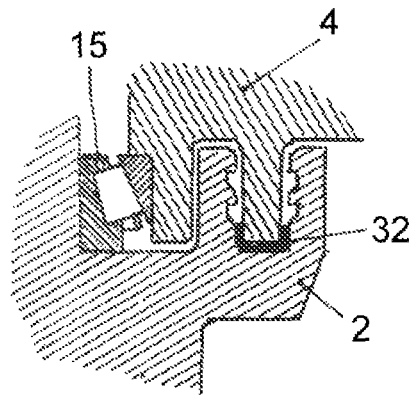
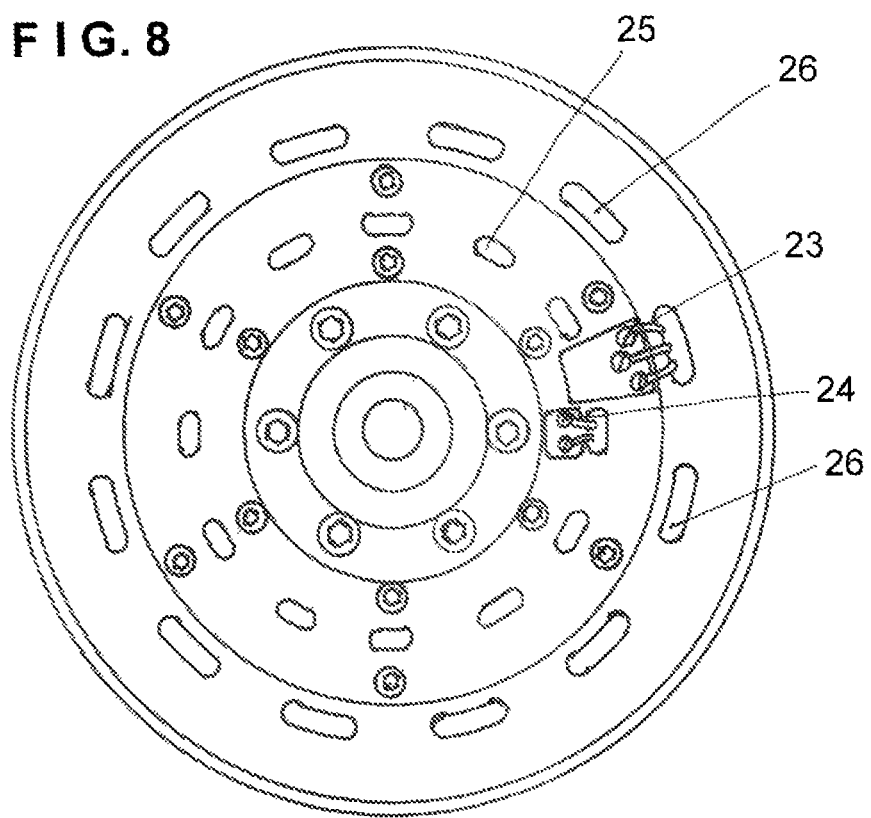

FIG. 11
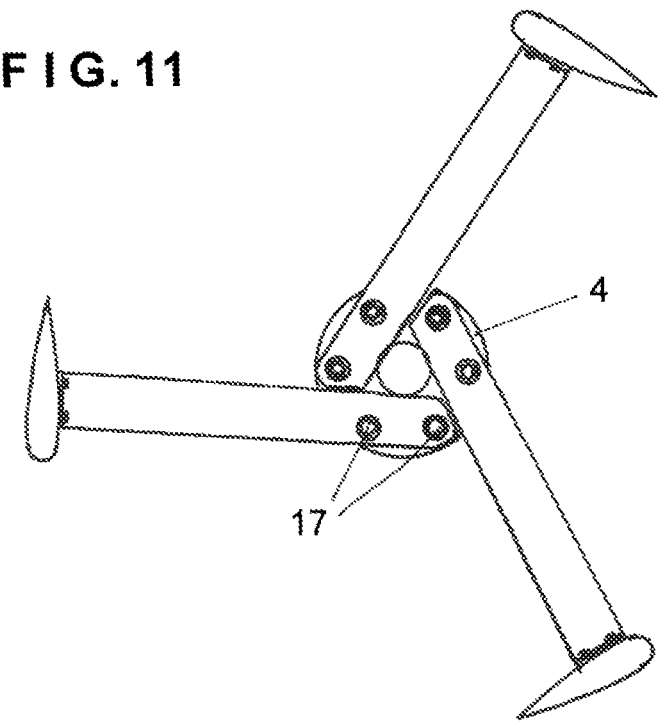
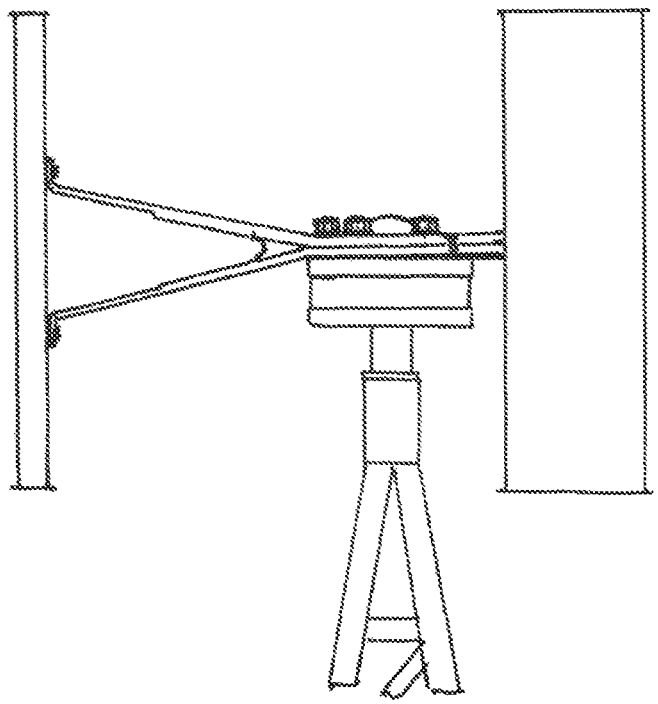

SYNCHRONOUS BRUSHLESS MULTIPOLAR MACHINE HAVING IMMOBILE ARMATURE AND FIELD WINDINGS

CROSS REFERENCE TO RELATED APPLICATIONS

This application is based on and claims priority under 35 U.S.C. §119 to Croatian Patent Application P20110305A, filed on Apr. 26, 2011, the entire content of which is incorporated herein by reference.

TECHNICAL FIELD OF THE INVENTION

The present invention relates to a synchronous alternating current machine, more specifically a brushless machine having an immobile stator armature, immobile armature windings, an immobile field yoke and an immobile field coil.

BACKGROUND OF THE INVENTION

Known synchronous machines, such as alternators or motors, in which rotating field coils are powered by electric current via contact rings, which are being energized by excitation current via contact brushes, may regulate the magnetic field and consequently regulate the induced voltage (for alternators) or torque (for electric motors).

Generally, the brushes and the contact rings are sensitive to environmental influences, especially dust, moisture and grease, which may cause malfunctions of the known synchronous machines. Therefore, the brushes and the contact rings may need to be replaced with time, which may result in increasing maintenance costs. In addition, in the case that the synchronous machine is operated at higher rotation speeds, the machines may create noise. Furthermore, worn out material of the brushes and the contact rings may be scattered into the environment. More specifically, metal and graphite dust may be dispersed into the air.

In addition, friction between the brushes and the contact rings generated in conditions of high temperatures and low air pressure because of a cooling situation may cause difficulties in operating the synchronous machines in vacuum. Generally, the contact rings are assembled so as to maintain clearance therebetween, therefore, the application of the synchronous machines under water may require additional means to provide, for example, a waterproof casing for the known synchronous machines.

The most commonly used machines are the synchronous machines having the brushes and the contact rings, from the smallest such as alternators for charging batteries and powering vehicles, to the biggest such as high-power synchronous generators in electric power plants. The synchronous machines are generally configured so as to conduct direct regulation of the excitation current, so that a large scope of application for the synchronous machines is ensured.

Disclosed in EP1394406A2, EP0120067A1, DE8913328U1 and DE19636591A1 are brushless synchronous machines that do not create the magnetic field by using a field coil, but instead by using permanent magnets which rotate inside or outside of a stator armature.

However, the known synchronous machines having the permanent magnets may not be able to regulate the excitation magnetic field and therefore to maintain the voltage (for the alternators) or the torque (for electric motors) within desired boundaries.

Specifically, synchronous machines having variable rotations per minute (RPM), e.g. wind turbines, where the RPM varies depending on the wind speed, may have difficulties to realize preferable operation thereof. In the case of such synchronous machines, the induced voltage is directly proportional to the RPM of a rotor and varies within the boundaries from $U_n$ (for wind speed of 6 m/s) to $5 \times U_n$ (for wind speed of 30 m/s). A practical application of synchronous generators having a voltage variance as great as mentioned above may need specific parts, which is relatively expensive and needs regular maintenance. Furthermore, using the synchronous generators having the larger voltage variance may cause energy losses.

Still further, the synchronous machine having the permanent magnet may limit the strength of the magnetic field. More specifically, deterioration of the permanent magnet due to aging, vibrations and temperature influences may, in extreme cases, disable the machine to be operable.

It has been suggested for a brushless synchronous engine to include an additional coil, in which the induced electrical energy is rectified with semiconductor elements built into the rotor, in order to overcome the drawback mentioned above.

The rectified current then transmits to a primary field coil while the excitation current is being regulated by varying the current in a secondary field winding. However, the brushless synchronous engine has a complex configuration and needs regular maintenance. Furthermore, the brushless synchronous engine may need the additional windings and electronic elements built into the rotor, which may increase the manufacturing cost, and the likelihood of malfunction of the synchronous machine.

A need thus exists to provide a brushless synchronous generator having a direct drive generator, which is applicable to a wind power plant and which is not susceptible to the drawback mentioned above.

SUMMARY OF THE INVENTION

According to an aspect of this disclosure, a synchronous brushless multipolar machine includes a shaft serving also as a field yoke, a rotor mounted to the shaft via first and second bearings and including a first rotor main body and a second rotor main body mutually connected by means of a nonmagnetic fixing ring, a power unit carrying disc made of a ferromagnetic material and fixed on the shaft by means of a first screw, a field coil fixed on the power unit carrying disc via a holding cylinder, a stator armature having a magnetic core, fixed on the power unit carrying disc via a nonmagnetic carrying ring, and armature windings, wound on the stator armature, wherein the stator armature, the armature windings and the field coil form a compact unit attached on the power unit carrying disc by means of a second screw.

BRIEF DESCRIPTION OF THE DRAWINGS

The foregoing and additional features and characteristics of the present invention will become more apparent from the following detailed description considered with the reference to the accompanying drawings, wherein:

FIG. 3 represents an exploded diagram with a cross sectional view of the brushless synchronous multipolar machine illustrated in FIG. 1A and FIG. 1B, illustrating the rotor body, a shaft and a power unit;

FIG. 5 is a side view and a top view with a cross sectional view of the shaft illustrating a position of a labyrinth ring of the shaft;

FIG. 6 illustrates an enlarged cross sectional view of a labyrinth air gap in which a tolerance ring is provided;

FIG. 7 illustrates an enlarged cross sectional view of the labyrinth air gap in which ferrofluid is provided;

FIG. 8 is a diagram of the power unit carrying disc viewed from a side of electric terminals and ventilation holes;

FIG. 11 is a diagram illustrating another example of adapting the brushless synchronous multipolar machine as the synchronous generator of a vertical axis wind turbine having plural wings.

DETAILED DESCRIPTION

[First Embodiment]

Figure 1A:
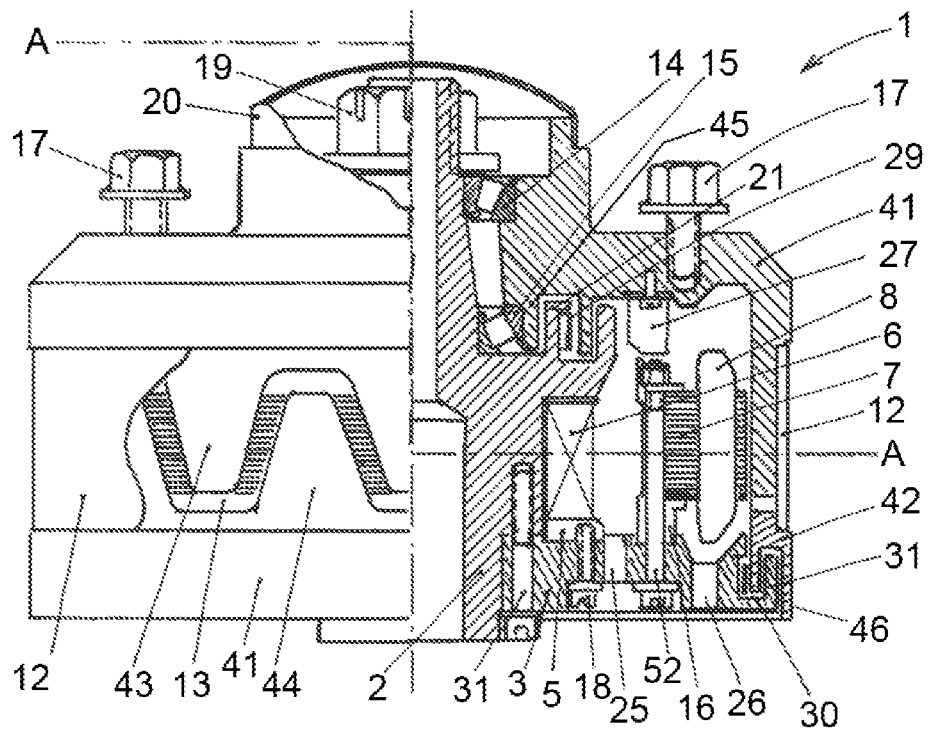
FIG. 1A is a side view with cross sectional view of a brushless synchronous multipolar machine according to the embodiment, taken along an axial line thereof.
Figure 1B:
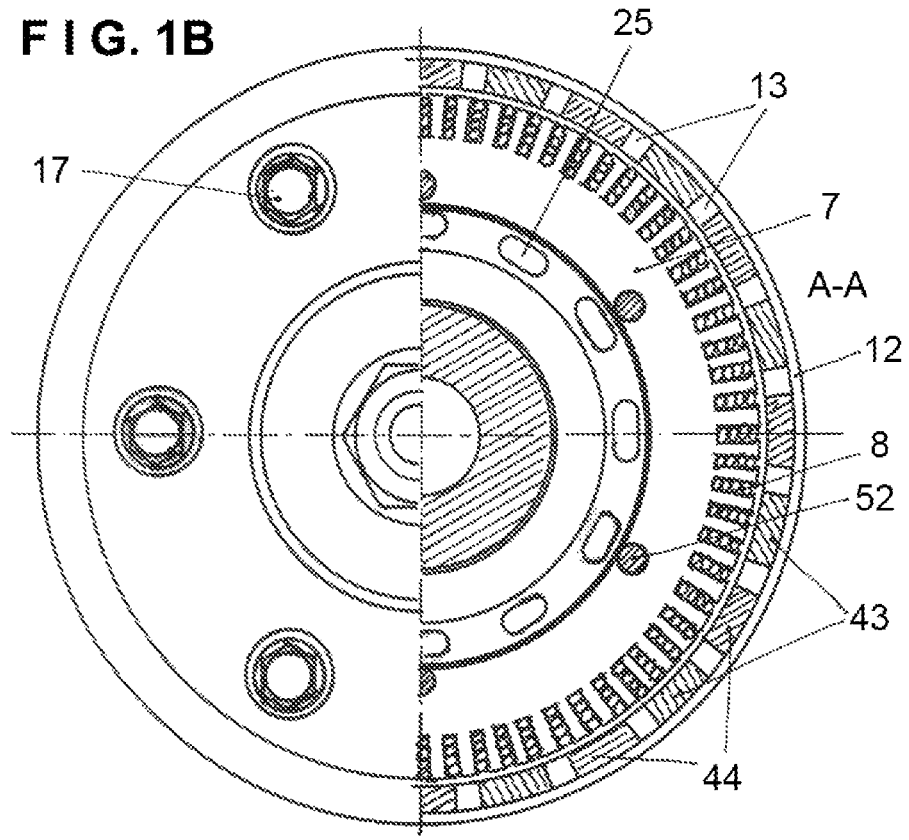
FIG. 1B is a top view with a cross sectional view of the brushless synchronous multipolar machine illustrated in FIG. 1A and taken along a line orthogonal to the axial line.

FIG. 1A is a cross section view of a brushless synchronous multipolar machine 1 according to this disclosure. FIG. 1B shows the cross section through an axis A of FIG. 1A, which is perpendicular to a rotation axis of the brushless synchronous multipolar machine 1, which will be hereinafter referred to as a synchronous machine 1.

As illustrated in FIG. 1A, FIG. 1B, and especially in the exploded diagram illustrated in FIG. 3, the synchronous machine 1 according to this disclosure includes a shaft 2 serving also as a field yoke, a rotor 4, and a power unit having a ferromagnetic power unit carrying disc 3. Field windings 6 (i.e. a field coil) and armature windings 8, a stator 7 are attached on the power base unit carrying disc 3, thereby forming the power base unit.

The shaft 2 is illustrated in detail in FIG. 5. The shaft 2 is made of a ferromagnetic material. According to this disclosure, the shaft 2 also serves as a magnetic excitation core and carries the power unit which is fixed to the shaft 2 by means of plural first screws 51. Furthermore, the shaft 2 includes a specifically constructed labyrinth ring 21. More specifically, the labyrinth ring 21 is arranged in a concentric manner relative to the shaft 2, so that the labyrinth ring 21 is outwardly positioned as a unit in a radial direction thereof.

The power unit carrying disc 3 integrally includes a labyrinth ring 31 in a concentric manner as a unit so as to be positioned at a radially outer end portion of the power unit carrying disc 3.

The rotor 4 includes a first rotor main body 41 and a second rotor main body 42. The first rotor main body of the rotor 4 includes a first labyrinth ring 45. The second rotor main body 42 of the rotor 4 includes a second labyrinth ring 46. The first labyrinth ring 45 of the rotor 4 is formed at a radially inner end portion of a first rotor main body 41 so as to extend in an axial direction of the shaft 2 and so as to correspond to the labyrinth ring 21 of the shaft 2 while avoiding a direct contact therewith, thereby forming the first air gap 29. The second labyrinth ring 46 of the rotor 4 is formed at an end portion of the second rotor main body 42 in the axial direction of the shaft 2 so as to correspond to the labyrinth ring 31 of the power unit carrying disc 3, while avoiding a direct contact therewith, thereby forming a second air gap 30. Accordingly, a surface of the first air gap 29, which is formed between the labyrinth ring 21 of the shaft 2 and the first labyrinth ring 45 of the rotor 4 and through which a magnetic flux is transmitted between the shaft 2 and the rotor 4, is increased. Similarly, a surface of the second air gap 30 formed between the labyrinth ring 31 of the power unit carrying disc 3 and the second labyrinth ring 46 of the rotor 4 is increased. As a result, a magnetic resistance in the first and second air gaps 29 and 30 is reduced, which may further result in reduction of energy losses in an excitation magnetic circuit.

The field windings 6 are secured on a holding cylinder 5, which is fixed on the power unit carrying disc 3 by means of plural screws 18. The holding cylinder 5 has a bracket shape in cross section taken along the axial direction, so that the field windings 6 are held at a recessed portion of the holding cylinder 5.

In order to bear a greater mechanical load generated between the rotor 4 and the shaft 2, roller bearings 14 and 15 having taper rollers are used.

Figure 12:
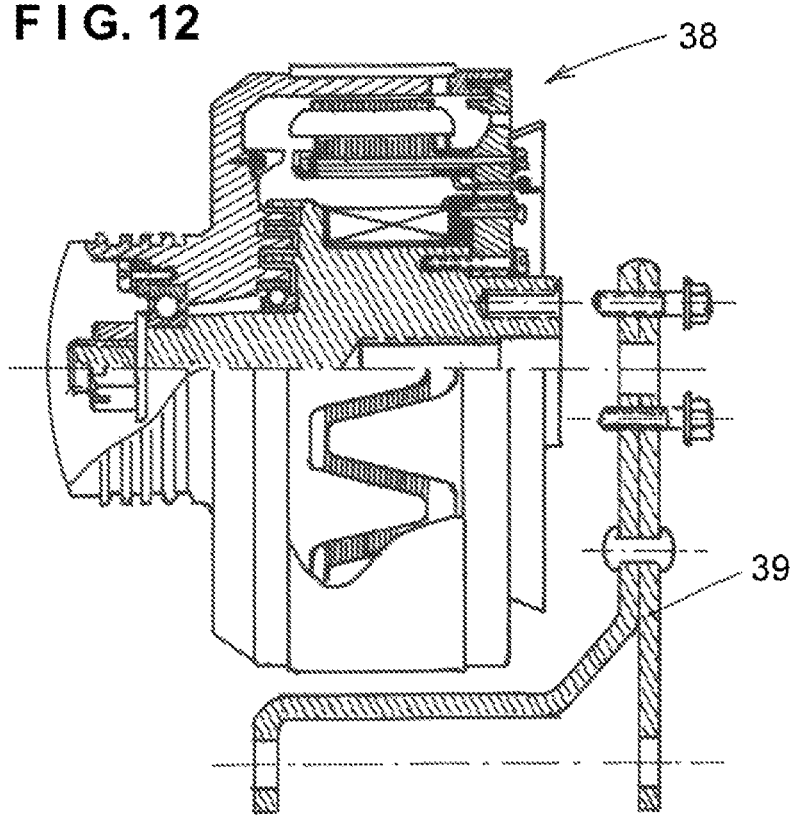
FIG. 12 is a side view of the brushless synchronous multipolar motor with the cross sectional view thereof in the case that the brushless synchronous multipolar motor is adapted to an automotive alternator.
Figure 13:
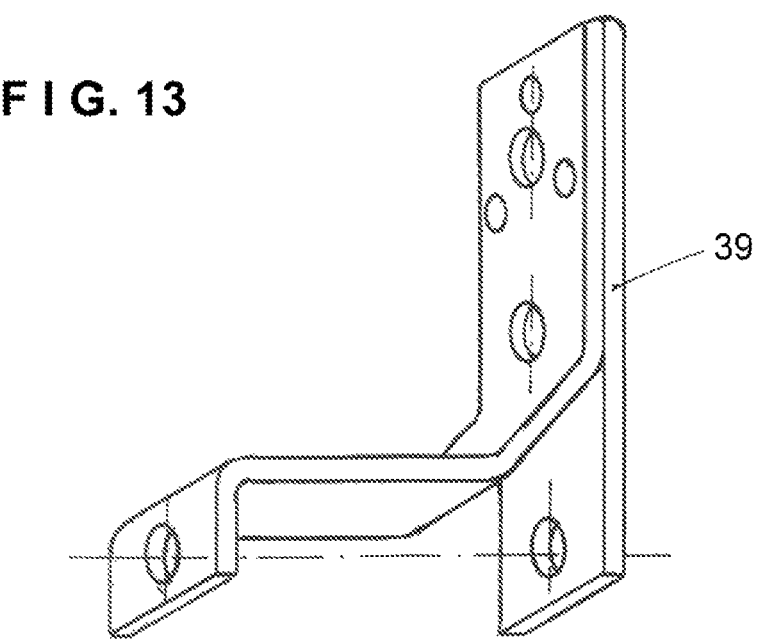
FIG. 13 is a diagram illustrating an automotive alternator support in the case that the brushless synchronous multipolar motor is adapted to the automotive alternator.

On the other hand, in the case that a relatively lower level of the mechanical load is generated between the rotor 4 and the shaft 2, for example, in the case that the synchronous machine 1 of the embodiment is adapted as an automobile alternator 38, ball bearings are used (see FIG. 12).

The roller bearing 14 is fixed on the rotor 4 by means of a nut 19, which is protected by a protective cover 20. On the other hand, the roller bearing 15 is provided at the shaft 2. More specifically, the roller bearing 15 is provided in a concentric manner relative to the shaft 2 so as to be radially inwardly positioned relative to the labyrinth ring 29.

The synchronous machine 1 of this embodiment includes either a ferromagnetic tolerance ring or a ferrofluid.

Figure 4:
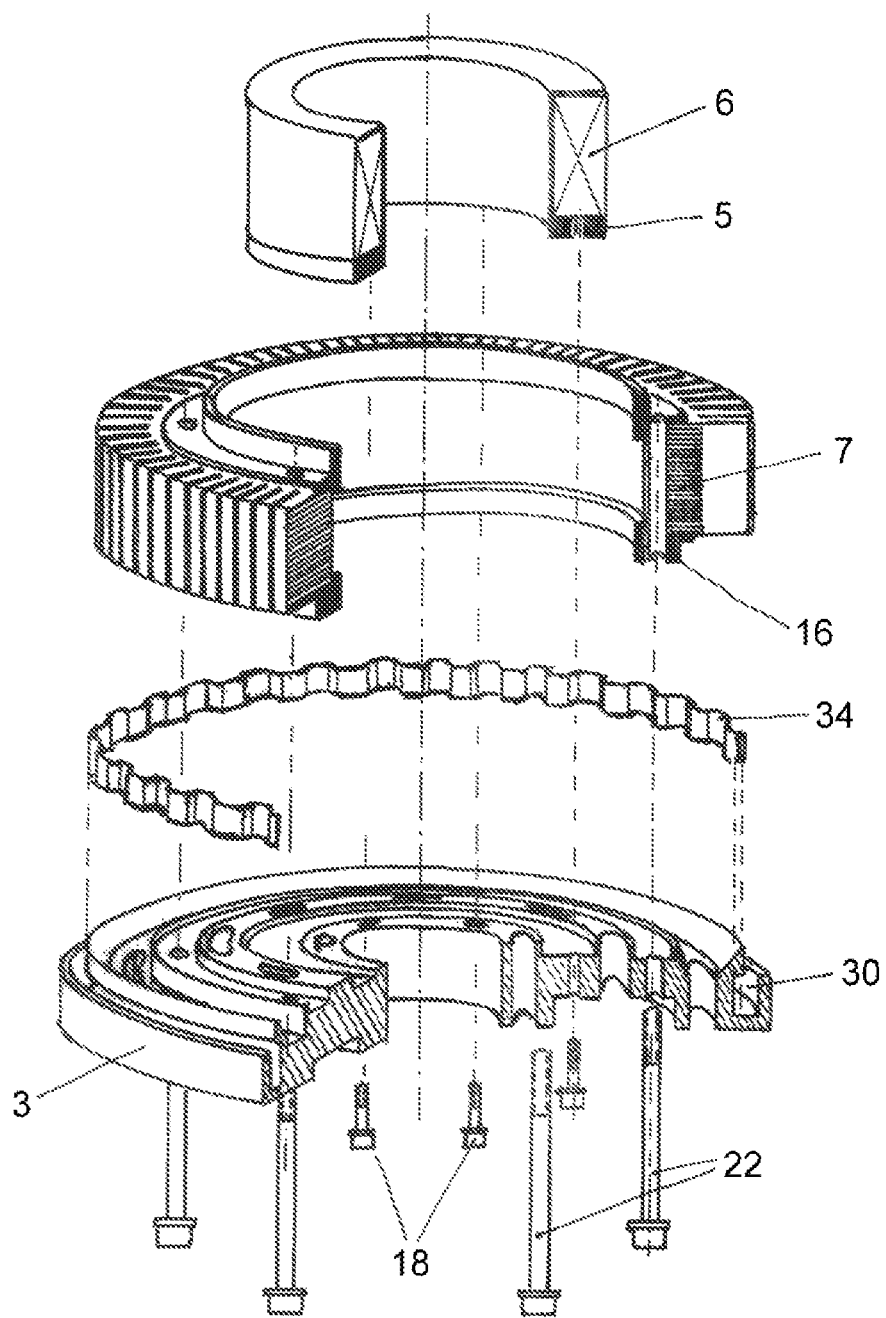
FIG. 4 is an exploded diagram with a cross sectional view of the power unit having a tolerance ring, a stator armature without armature windings, and a field coil.

For example, in the case that the synchronous machine 1 is operated at lower rotations per minute, which will be hereinafter referred to as RPM, in order to further reduce the air gap magnetic resistance, ferromagnetic tolerance rings 33 and 34 are provided in the air gaps 29 and 30, respectively, as illustrated in FIG. 4 and FIG. 5. In order to reduce a friction generated in the vicinity of the tolerance rings 33 and 34, a lubricant is provided in the air gaps 29 and 30.

On the other hand, in the case of the synchronous machine 1 being operated at a higher RPM, a ferrofluid 32, which ensures a good magnetic conduction with minimal friction, is provided in the air gaps 29 and 30, thereby further reducing the magnetic resistance.

Figure 9:
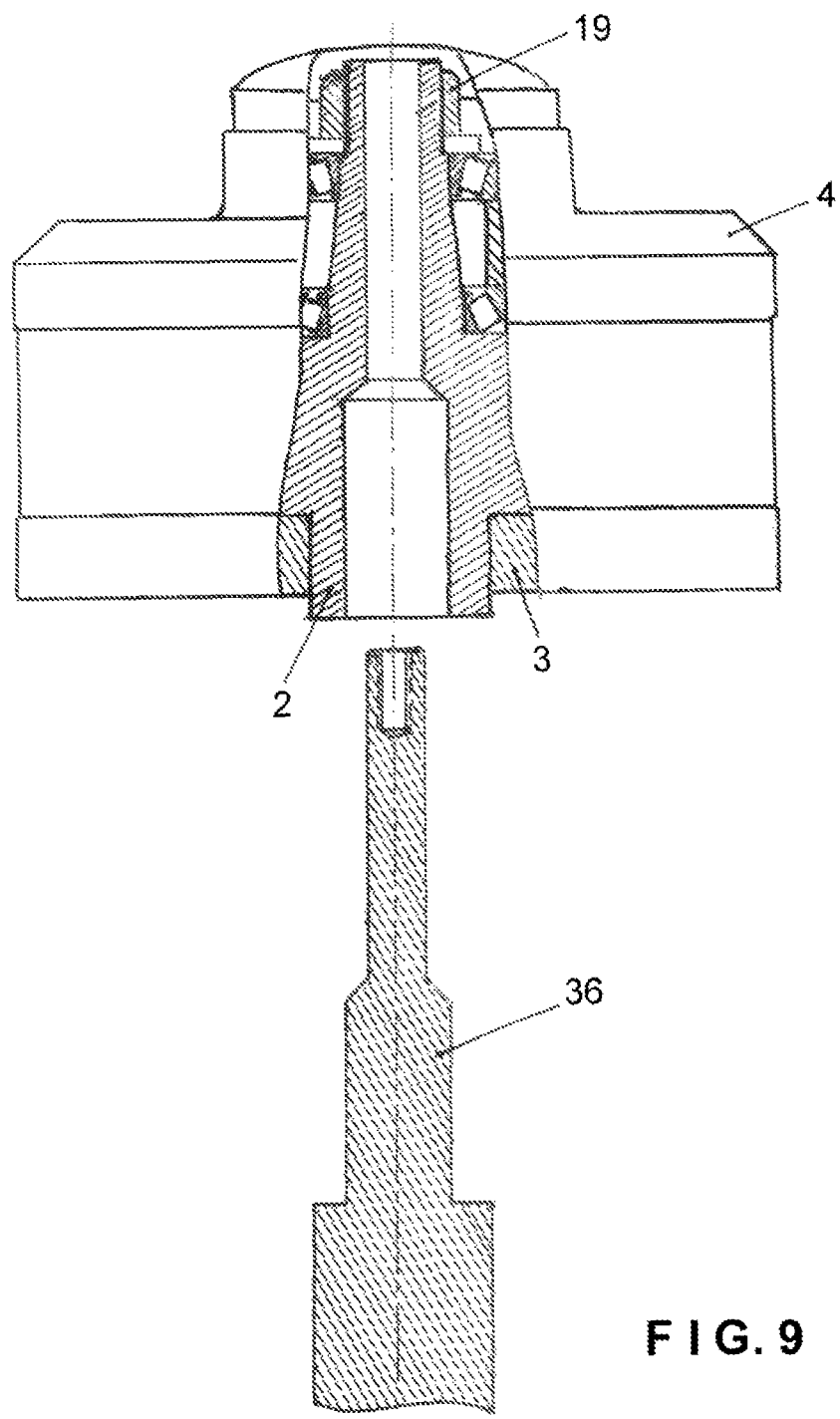
FIG. 9 is a cross sectional view of the brushless synchronous multipolar machine and a supporting center shaft.

As illustrated in FIG. 9, the shaft 2 has an elongated center hole, through which a supporting center shaft 36 is inserted, thereby facilitating the synchronous machine 1 to be easily assembled and further improving the mechanical reliability of the synchronous machine 1.

According to the synchronous machine 1 of this embodiment, the excitation voltage is applied to connection clamps 24, so that excitation electric current flows through the field windings 6, and induces the excitation magnetic flux in the shaft 2. The magnetic flux is transferred between the shaft 2 and the rotor 4 through the first air gap 29 of the labyrinth ring 21 and forms a first excitation pole, which then magnetizes the stator armature 7 through the air gap between first polar teeth 43 and the stator armature 7.

Further, the excitation magnetic flux is transmitted between the stator armature 7 and the second polar teeth 44 of the second rotor main body 42. Further, the excitation magnetic flux is transferred between the second labyrinth rings 46 via the second air gap 30 to the radially outer edge of the power unit carrying disc 3, which is fixed on the shaft 2 by means of the first screws 51.

Accordingly, the first and second polar teeth 43 and 44 generate a rotational magnetic field around the stator armature 7 while the rotor 4 rotates, thereby inducing an alternating voltage in the armature windings 8.

The stator 7 is secured on a nonmagnetic carrying ring 16, which is fixed on the power unit carrying disc 3 by means of plural second screws 52.

The first polar teeth 43 serving as the first magnetic pole are formed on a portion of The first rotor main body 41 of the rotor 4, which is slightly radially inwardly from an outer edge portion of the first rotor main body 41 in the radial direction, so as to protrude in the axial direction of the shaft 2. Accordingly, the first rotor base portion 41 has an uneven outer circumferential surface. Similarly, the second polar teeth 44 serving as the second magnetic pole are formed on the second rotor main body 42 of the rotor 4 so as to extend from a radially inner end portion thereof in the axial direction of the shaft 2 while forming an uneven circumferential surface. A width from the outer edge portion of the first rotor main body 41 and the first polar teeth 43, and from an outer edge portion of the second rotor main body 42 in the radial direction thereof and the second polar teeth 44, is formed so as to correspond to a thickness of an outer fixing ring 12 made of a nonmagnetic material. A width of the fixing ring 12 is set so as to be greater than a sum of a maximum length of the first polar teeth 43 in the axial direction and a maximum length of the second polar teeth 44 in the radial direction in order to keep a distance (i.e. a clearance 13) between the first polar teeth 43 and the second polar teeth 44, which are meshed with each other while keeping the clearance 13, when the first rotor main body 41 and the second rotor main body 42 are assembled to form the rotor 4. Accordingly, the first rotor main body 41 and the second rotor main body 42 are connected to each other by means of the outer fixing ring 12, so that the first rotor main body 41 and the second rotor main body 42, therefore the first and the second magnetic poles, rotate around the stator armature 7 as a unit while keeping the clearance 13 between the first polar teeth 43 and the second polar teeth 44.

According to the embodiment, the clearance 13 formed between the first and second polar teeth 43 and 44 is filled with a nonmagnetic and nonconductive material, e.g. an epoxide mass and the like, in such a manner that the first and second polar teeth 43 and 44 form a compact cylindrical unit together with the fixing ring 12. Therefore, the rotor 4 forms a cylinder portion having a smooth (even) outer circumferential surface and a smooth (even) inner circumferential surface, thus minimizing rotation-caused air turbulence and noise.

Rotation of the rotor 4 having the first and second polar teeth 43 and 44 generates a rotating magnetic field in the stator armature 7, which induces an alternating electromotive force in the armature windings 8. Accordingly, an alternating voltage is generated at armature windings connection clamps 23. In FIG. 8, three armature winding connection clamps 23 are provided for the synchronous machine 1. However, any desired number of the armature winding connection clamps 23 may be provided at the synchronous machine 1 in accordance with a desired rotation speed of the rotor 4 and the number of polar pairs, as is known from the theory of synchronous electric machines.

Figure 2:
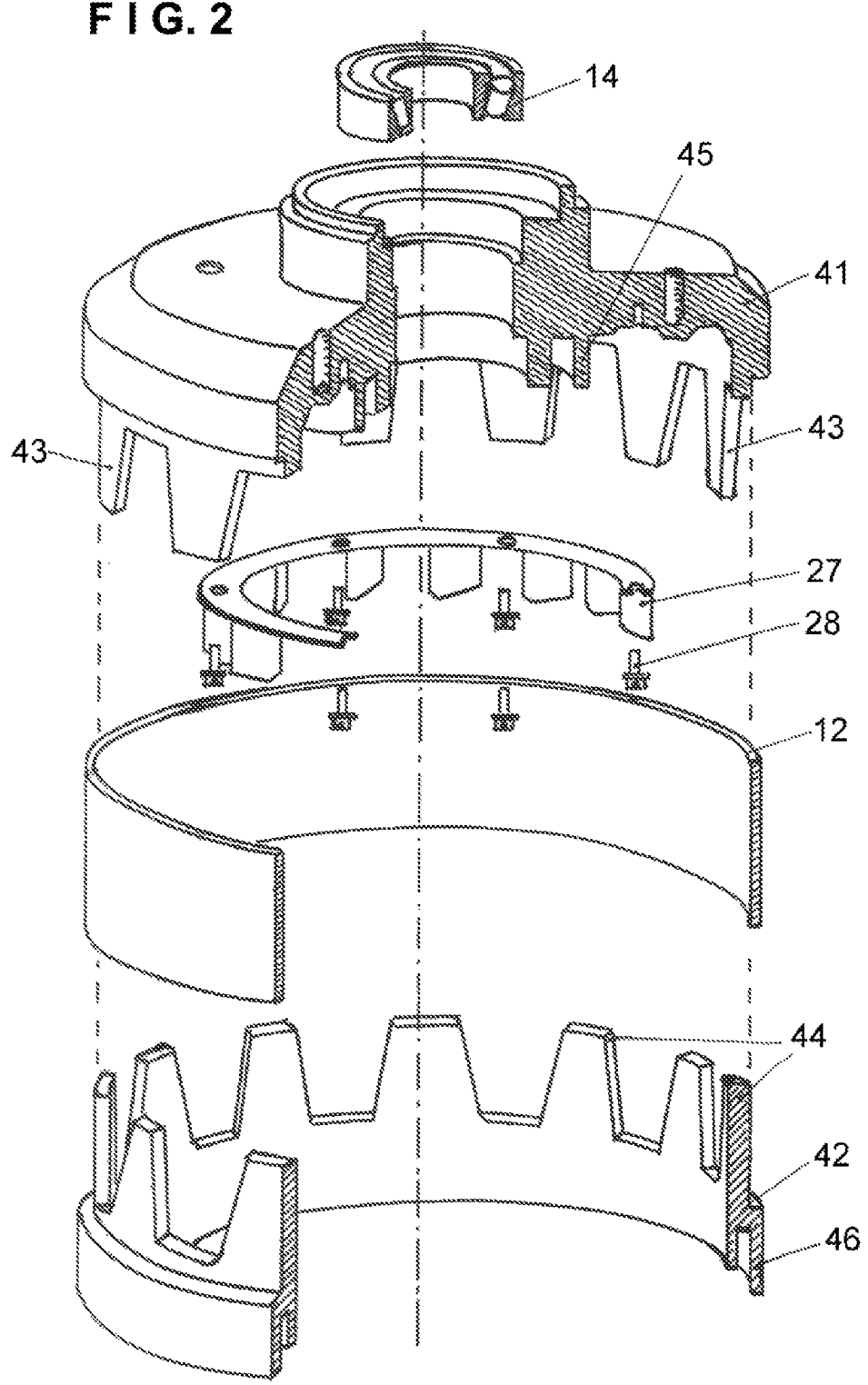
FIG. 2 is an exploded diagram with a cross sectional view of a synchronous machine rotor illustrating a rotor body and polar teeth, a fixing ring and a radial cooling fan.

The synchronous machine 1 further includes a radial cooling fan 27 having plural fins extending diagonally relative to the radial direction of the rotor 4. The radial cooling fan 27 is secured on an inner side of the first rotor main body 41 of the rotor 4 by means of plural screws 28, as illustrated in FIG. 2. More specifically, the radial cooling fan 27 is fixed on the inner side of the first main rotor body 41 so that the radial cooling fan is positioned, for example, above the stator 7. The radial cooling fan 27 circulates the air from a space formed around the field winding 6 to a space formed around the armature windings 8. Still further, the power unit carrying disc 3 includes air intake openings 25 and air exhaust openings 26 in order to facilitate the air circulation. In FIG. 1A, the radial cooling fan 27 is positioned above the stator 7. However, the position of the radial cooling fan 27 may be changed or modified depending on a design of the stator 4 as long as the radial cooling fan 27 circulates the air from the space in the vicinity of the field windings 6 to the space in the vicinity of the stator 7.

[Other Embodiments]

The synchronous machine 1 according to the first embodiment may be modified as follows.

Figure 10:
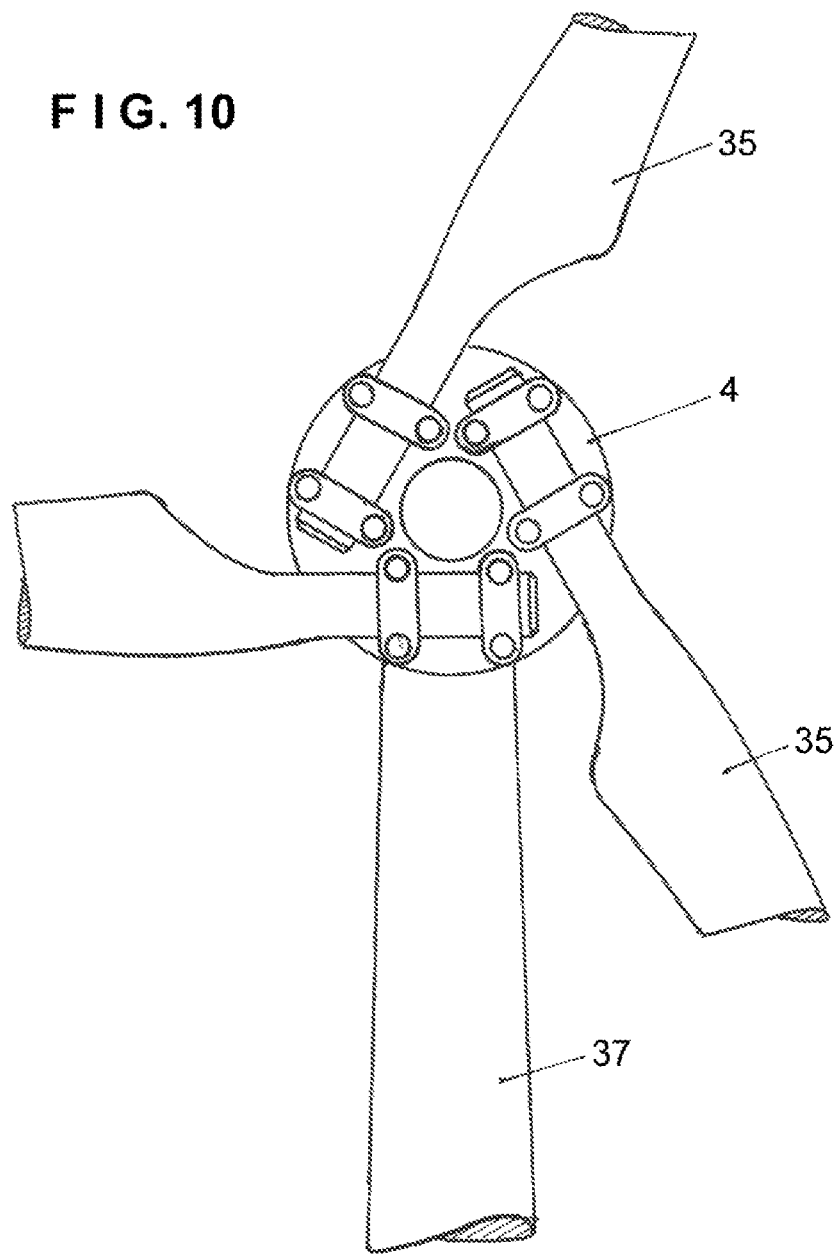
FIG. 10 is a diagram illustrating an example of an application of the brushless synchronous multipolar machine as a synchronous generator of a horizontal axis wind turbine having plural wings.

Illustrated in FIG. 10 is an example of a usage of the synchronous machine 1, which is adapted to a horizontal axis wind turbine. In this case, plural wings 35 of the wind turbine are attached directly to the rotor 4 of the synchronous machine 1. In FIG. 10, three wings 35 are secured on the rotor 4, however, any desired number of the wings 35 may be used. The wings 35 are arranged eccentrically to a rotation axis, so that a better mechanical durability is achieved and vibrations caused at the shaft 2 are reduced. Furthermore, the rotor 4 is secured on the supporting center shaft 36, which extends from a supporting pole of a power plant, in a manner that the supporting center shaft 36 is securely inserted into the center hole of the shaft 2.

Illustrated in FIG. 11 is another example of a usage of the synchronous machine 1 adapted to a vertical axis wind turbine. In this case, plural wings are secured directly to the rotor 4 by means of plural screws 17.

Furthermore, the synchronous machine 1 may be modified so as not to includes any one of the ferromagnetic tolerance rings 33 and 34 and the ferrofluid 32.

The synchronous machine 1 includes the radial cooling fan 27 according to the above described embodiment. However, the synchronous machine 1 may be modified so as not to include the radial codling fan 27.

Furthermore, the synchronous machine 1 of the first embodiment may be modified and adapted to various usages as follows.

Firstly, the synchronous machine 1 may be used as a synchronous generator, which generates an alternating current, of a wind power plant having a vertical rotor 4. In this case, considering the large load durability of the rotor, plural wings are attached directly to the rotor 4 without any adjusting elements. Preferably, the wings are attached to the rotor 4 in an eccentric manner in order to reduce vibrations generated at the rotor 4.

Secondly, the synchronous machine 1 may be used as a synchronous generator, which generates the alternating current, of a wind power plant having a horizontal rotor 4.

Thirdly, the synchronous machine 1 may be modified so as to generate a lower power and be operated at a higher RPM, so that the synchronous machine 1 is adapted as the alternator 38 of an automotive. For example, the alternator 38 may be attached to an engine of the automobile via a holder 39. In this case, considering a smaller induction generated at the first and second air gaps 29 and 30, which are respectively formed between the rotor 4 on the one hand and the labyrinth rings 21 and 31 on the other hand, the tolerance rings 33 and 34 and injection of the ferrofluid are not needed, therefore the construction of the synchronous machine 1 may be simplified.

Fourthly, the synchronous machine 1 may be used, without any modifications, as a synchronous engine.

According to the embodiments, the synchronous machine 1 having the above configuration may be widely adapted to any kind of a generator without modifying the configuration or a design of the synchronous machine 1 of the embodiments.

Accordingly, because the shaft 2 also serves as the field yoke, the brushless synchronous multipolar machine 1 does not need to include an additional field yoke, so that a size and a weight of the brushless synchronous multipolar machine 1 may be reduced. Furthermore, because the rotor 4 does not include any electrical component, the weight of the brushless synchronous multipolar machine 1 may be further decreased. Still further, the stator armature 7, the armature windings 8 and the field coil 6 are provided on the power unit carrying disc 3 so as to form the power unit. Therefore, the power unit is easily attached to and removed from the brushless synchronous multipolar machine 1. Moreover, the brushless synchronous multipolar machine 1 may be used under water and in vacuum.

According to the embodiments, the second rotor main body 42 of the rotor 4 integrally includes the second labyrinth ring 46 as the unit. The power unit carrying disc 3 integrally includes the labyrinth ring 31 arranged in the concentric manner as the unit. Furthermore, the second labyrinth ring 46 of the rotor 4 and the labyrinth ring 31 of the unit carrying disc 3 form the second air gap 30, through which the magnetic flux is transferred between the labyrinth ring 31 and the second rotor main body 42 of the rotor 4 having the second polar teeth 44 serving as the second magnetic pole.

Accordingly, because the second labyrinth ring 46 is integrally formed at the second rotor main body 42 as the unit, the size and the weight of the brushless synchronous multipolar machine 1 may be decreased. Furthermore, the magnetic resistance is reduced because the surface of the second air gap 30, which is formed between the labyrinth ring 31 of the power unit carrying disc 3 and the second labyrinth ring 46 of the rotor 4, is increased and because the labyrinth rings 31 and 46 are used as magnetic flux carriers. As a result, an operational efficiency of the brushless synchronous multipolar machine 1 may be increased.

According to the embodiments, the power unit carrying disc 3 includes the field coil 6, the stator armature 7 and the armature windings 8 as the unit, which is detachable from the synchronous machine 1 by unscrewing the first screw 51, without disassembling the shaft 2 and the rotor 4.

Accordingly, because the field coil 6, the stator armature 7, the armature windings 8 and the power unit carrying disc 3 forms the power unit, which is secured on the shaft 2 of the brushless synchronous multipolar machine q by means of the first screw 51, the power unit is easily attached to and detached from the brushless synchronous multipolar machine 1. As a result, manufacturing costs of the brushless synchronous multipolar machine 1 and maintenance costs of the same may be decreased.

According to the embodiments, the shaft 2 integrally includes the labyrinth ring 21 arranged in the concentric manner as the unit. The first rotor main body 41 integrally includes the first labyrinth ring 45 as the unit. The labyrinth ring 21 of the shaft 2 and the first labyrinth ring 45 of the rotor 4 form the first air gap 29, through which the magnetic flux is transferred between the labyrinth ring 21 of the shaft 2 and the first labyrinth ring 45 of the rotor 4. Furthermore, the first labyrinth ring 45 of the rotor 4 and the labyrinth ring 21 of the shaft 2 are arranged so as to avoid the contact therebetween, so as to allow the rotor 4 to be freely rotatable while increasing the cross section of the first air gap 29 through which the magnetic flux is transferred between the shaft 2 and the first rotor main body 41 having first polar teeth 43 serving also as the first magnetic pole.

Accordingly, because the shaft 2 integrally includes the labyrinth ring 21 as the unit, and because the first rotor main body 41 integrally includes the first labyrinth ring 45 as the unit, the size and the weight of the brushless synchronous multipolar machine 1 may be decreased. Furthermore, the magnetic resistance is reduced because the surface of the first air gap 29, which is formed between the labyrinth ring 21 of the shaft 2 and the first labyrinth ring 45 of the rotor 4, is increased and because the labyrinth rings 21 and 45 are used as the magnetic flux carriers. As a result, the operational efficiency of the brushless synchronous multipolar machine 1 may be increased.

According to the embodiments, each of the labyrinth ring 21 of the shaft 2 and the labyrinth ring 31 of the power unit carrying disc 3 has a specifically constructed ring-shaped groove. Specifically constructed ferromagnetic tolerance rings 33 and 34 are provided in the grooves of the labyrinth ring 21 of shaft 2 and the labyrinth ring 31 of the power unit carrying disc 3, respectively.

Accordingly, the magnetic resistance may be reduced. As a result, the operational efficiency of the brushless synchronous multipolar machine 1 may be increased.

According to the embodiments, each of the labyrinth ring 21 of the shaft 2 and the labyrinth ring 31 of the power unit carrying disc 3 has the specifically constructed ring-shaped groove, in which the ferrofluid 32 is provided.

Accordingly, the magnetic resistance may be further reduced. As a result, the operational efficiency of the brushless synchronous multipolar machine 1 may be further increased.

According to the embodiments, the wind power-plant wing 35 is directly attached on the rotor 4 by means of the screw 17 in the eccentric manner relative to the rotational axis of the rotor 4.

According to the embodiments, the shaft 2 includes the elongated center hole, through which the center shaft 36 of the supporting pole 37 of a power plant is inserted.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A synchronous brushless multipolar machine comprising:
   a shaft serving also as a field yoke;

a rotor mounted to the shaft via first and second bearings and including a first rotor main body and a second rotor main body mutually connected by means of a nonmagnetic fixing ring;

a power unit carrying disc made of a ferromagnetic material and fixed on the shaft by means of a first screw;

a field coil fixed on the power unit carrying disc via a holding cylinder;

a stator armature having a magnetic core, fixed on the power unit carrying disc via a nonmagnetic carrying ring; and armature windings wound on the stator armature;

wherein the stator armature, the armature windings and the field coil form a compact unit attached on the power unit carrying disc by means of a second screw.

2. A synchronous brushless multipolar machine according to claim 1, wherein the second rotor main body of the rotor integrally includes a second labyrinth ring as a unit, the power unit carrying disc integrally includes a labyrinth ring arranged in a concentric manner as a unit, and the second labyrinth ring of the rotor and the labyrinth ring of the unit carrying disc form a second air gap, through which a magnetic flux is transferred between the labyrinth ring and the second rotor main body of the rotor having the second polar teeth serving as a second magnetic pole.

3. A synchronous brushless multipolar machine according to claim 1, wherein the power unit carrying disc includes the field coil, the stator armature and the armature windings as the unit, which is detachable from the synchronous machine by unscrewing the first screw, without disassembling the shaft and the rotor.

4. A synchronous brushless multipolar machine according to claim 2, wherein the power unit carrying disc includes the field coil, the stator armature and the armature windings as the unit, which is detachable from the synchronous machine by unscrewing the first screw, without disassembling the shaft and the rotor.

5. A synchronous brushless multipolar machine according to claim 1, wherein the shaft integrally includes a labyrinth ring arranged in a concentric manner as a unit, the first rotor main body integrally includes a first labyrinth ring as a unit, the labyrinth ring of the shaft and the first labyrinth ring of the rotor form a first air gap, through which the magnetic flux is transferred between the labyrinth ring of the shaft and the first labyrinth ring of the rotor, and the first labyrinth ring of the rotor and the labyrinth ring of the shaft are arranged so as to avoid a contact therebetween, so as to allow the rotor to be freely rotatable while increasing a cross section of the first air gap through which the magnetic flux is transferred between the shaft and the first rotor main body having first polar teeth serving also as a first magnetic pole.

6. A synchronous brushless multipolar machine according to claim 1, wherein each of the labyrinth ring of the shaft and the labyrinth ring of the power unit carrying disc has a specifically constructed ring-shaped groove, and specifically constructed ferromagnetic tolerance rings are provided in the grooves of the labyrinth ring of shaft and the labyrinth ring of the power unit carrying disc, respectively.

7. A synchronous brushless multipolar machine according to claim 2, wherein each of the labyrinth ring of the shaft and the labyrinth ring of the power unit carrying disc has a specifically constructed ring-shaped groove, and specifically constructed ferromagnetic tolerance rings are provided in the grooves of the labyrinth ring of shaft and the labyrinth ring of the power unit carrying disc, respectively.

8. A synchronous brushless multipolar machine according to claim 3, wherein each of the labyrinth ring of the shaft and the labyrinth ring of the power unit carrying disc has a specifically constructed ring-shaped groove, and specifically constructed ferromagnetic tolerance rings are provided in the grooves of the labyrinth ring of shaft and the labyrinth ring of the power unit carrying disc, respectively.

9. A synchronous brushless multipolar machine according to claim 4, wherein each of the labyrinth ring of the shaft and the labyrinth ring of the power unit carrying disc has a specifically constructed ring-shaped groove, and specifically constructed ferromagnetic tolerance rings are provided in the grooves of the labyrinth ring of shaft and the labyrinth ring of the power unit carrying disc, respectively.

10. A synchronous brushless multipolar machine according to claim 5, wherein each of the labyrinth ring of the shaft and the labyrinth ring of the power unit carrying disc has a specifically constructed ring-shaped groove, and specifically constructed ferromagnetic tolerance rings are provided in the grooves of the labyrinth ring of shaft and the labyrinth ring of the power unit carrying disc, respectively.

11. A synchronous brushless multipolar machine according to claim 1, wherein each of the labyrinth ring of the shaft and the labyrinth ring of the power unit carrying disc has a specifically constructed ring-shaped groove, in which a ferrofluid is provided.

12. A synchronous brushless multipolar machine according to claim 2, wherein each of the labyrinth ring of the shaft and the labyrinth ring of the power unit carrying disc has a specifically constructed ring-shaped groove, in which a ferrofluid is provided.

13. A synchronous brushless multipolar machine according to claim 3, wherein each of the labyrinth ring of the shaft and the labyrinth ring of the power unit carrying disc has a specifically constructed ring-shaped groove, in which a ferrofluid is provided.

14. A synchronous brushless multipolar machine according to claim 4, wherein each of the labyrinth ring of the shaft and the labyrinth ring of the power unit carrying disc has a specifically constructed ring-shaped groove, in which a ferrofluid is provided.

15. A synchronous brushless multipolar machine according to claim 5, wherein each of the labyrinth ring of the shaft and the labyrinth ring of the power unit carrying disc has a specifically constructed ring-shaped groove, in which a ferrofluid is provided.

16. A synchronous brushless multipolar machine according to claim 1, wherein a wind power-plant wing is directly attached on the rotor by means of a screw in an eccentric manner relative to a rotational axis of the rotor.

17. A synchronous brushless multipolar machine according to claim 1, wherein the shaft includes an elongated center hole, through which a center shaft of a supporting pole of a power plant is inserted.

18. A synchronous brushless multipolar machine according to claim 2, wherein the shaft includes an elongated center hole, through which a center shaft of a supporting pole of a power plant is inserted.

* * * * *